United States Patent
Perron et al.

(10) Patent No.: US 7,757,121 B1
(45) Date of Patent: Jul. 13, 2010

(54) REQUIREMENT DRIVEN INTEROPERABILITY/COMPLIANCE TESTING SYSTEMS AND METHODS

(75) Inventors: François Perron, Laprairie (CA); Sylvain Gauthier, Laprairie (CA)

(73) Assignee: Cydone Solutions Inc., Montreal, Québec (CA)

(*) Notice: Subject to any disclaimer, the term of this patent is extended or adjusted under 35 U.S.C. 154(b) by 579 days.

(21) Appl. No.: 11/738,812

(22) Filed: Apr. 23, 2007

Related U.S. Application Data (60) Provisional application No. 60/793,635, filed on Apr. 21, 2006.

(51) Int. Cl.
*G06F 11/00* (2006.01)
(52) U.S. Cl. ............ 714/26; 714/25; 714/32; 714/37; 714/38
(58) Field of Classification Search ......... 714/25, 714/26, 32, 37, 38
See application file for complete search history.

(56) References Cited

U.S. PATENT DOCUMENTS

| | | | | |
|---|---|---|---|---|
| 5,475,843 A | * | 12/1995 | Halviatti et al. | 717/124 |
| 5,790,117 A | * | 8/1998 | Halviatti et al. | 715/744 |
| 5,848,236 A | * | 12/1998 | Dearth et al. | 714/33 |
| 5,903,718 A | * | 5/1999 | Marik | 714/38 |
| 5,991,897 A | * | 11/1999 | Perugini et al. | 714/27 |
| 6,219,802 B1 | * | 4/2001 | Beeker et al. | 714/32 |
| 6,571,358 B1 | * | 5/2003 | Culotta et al. | 714/33 |
| 6,622,271 B1 | * | 9/2003 | Colby et al. | 714/724 |
| 6,697,961 B1 | * | 2/2004 | Petrenko et al. | 714/26 |
| 6,732,296 B1 | * | 5/2004 | Cherny et al. | 714/32 |
| 6,792,377 B1 | * | 9/2004 | Agrawal et al. | 702/119 |
| 6,980,916 B1 | * | 12/2005 | Katz et al. | 702/119 |
| 6,993,747 B1 | * | 1/2006 | Friedman | 717/124 |
| 7,043,400 B2 | * | 5/2006 | Stobie et al. | 702/183 |
| 7,065,676 B1 | * | 6/2006 | Lang et al. | 714/33 |
| 7,117,484 B2 | * | 10/2006 | Hartman et al. | 717/126 |
| 7,171,588 B2 | * | 1/2007 | Friedman et al. | 714/38 |
| 7,366,955 B2 | * | 4/2008 | Kuturianu et al. | 714/38 |
| 7,447,966 B2 | * | 11/2008 | Kamannavar et al. | 714/741 |
| 7,496,815 B2 | * | 2/2009 | Bhaumik et al. | 714/724 |
| 7,523,447 B1 | * | 4/2009 | Callahan et al. | 717/135 |
| 2003/0097233 A1 | * | 5/2003 | Sutton et al. | 702/123 |
| 2003/0097650 A1 | * | 5/2003 | Bahrs et al. | 717/124 |
| 2004/0117799 A1 | * | 6/2004 | Brockway et al. | 719/310 |
| 2004/0153774 A1 | * | 8/2004 | Gavish et al. | 714/25 |
| 2004/0199818 A1 | * | 10/2004 | Boilen et al. | 714/25 |
| 2005/0132333 A1 | * | 6/2005 | Neumann et al. | 717/124 |
| 2005/0154939 A1 | * | 7/2005 | De Pauw et al. | 714/25 |
| 2005/0188262 A1 | * | 8/2005 | Rosenman et al. | 714/25 |
| 2005/0268171 A1 | * | 12/2005 | House et al. | 714/32 |
| 2007/0038890 A1 | * | 2/2007 | El Far et al. | 714/25 |
| 2007/0061625 A1 | * | 3/2007 | Acosta et al. | 714/38 |

(Continued)

*Primary Examiner*—Robert Beausoliel
*Assistant Examiner*—Joshua P Lottich
(74) *Attorney, Agent, or Firm*—C Marc Benoît; Benoît & Côté s.e.n.c.

(57) ABSTRACT

A system and method for requirement driven interoperability/compliance testing of Hardware and Software in a distributed environment. Three modules are configured as a default system: a test definition, a SUT definition and a test result. A series of tree elements are coupled to represent requirements to test case mapping. Test cases are executed and components in the system are assigned with test results while requirements coverage is computed. Auto-detection of additional parts and test cases enables validity checking of the requirement to test case tree and reports are generated.

13 Claims, 4 Drawing Sheets

U.S. PATENT DOCUMENTS

2007/0079199 A1* 4/2007 Chorn et al. ................. 714/733
2007/0101196 A1* 5/2007 Rogers et al. ................. 714/38
2007/0214178 A1* 9/2007 Sheffler et al. ........... 707/104.1
2007/0220342 A1* 9/2007 Vieira et al. .................. 714/33
2008/0082959 A1* 4/2008 Fowler ....................... 717/104
2009/0119048 A1* 5/2009 Balog .......................... 702/83

* cited by examiner

REQUIREMENT DRIVEN INTEROPERABILITY/COMPLIANCE TESTING SYSTEMS AND METHODS

CROSS-REFERENCE TO RELATED APPLICATIONS

This application claims priority under 35USC §119(e) of U.S. provisional patent application 60/793,635, filed on Apr. 21, 2006, the specification of which is hereby incorporated by reference.

TECHNICAL FIELD

The present application relates to methods for testing and evaluating whether systems or processes comply with established requirements or standards.

BACKGROUND

Products are always increasing in complexity and end users expect more features and functionalities from each subsequent versions and revisions of a specific product. It is not unusual for a design team to juggle with literally thousands of requirements during the course of a project, such as for automotive or telecommunication systems.

Some of these requirements evolve during the product development cycle and modifications to the design occur to comply with these modified requirements. Problems are also found during the design and testing phase, which also generate changes to the product itself. Feedback from the users is also incorporated into subsequent revisions of a product and through lab and field trials. Minute changes and customer specific modifications are often introduced to the first few batches of a product (or prototypes of this product) on an individual basis while the manufacturing process is still in tuning mode.

All these changes occur at various levels of the products and have diverse impacts on the performance and functionality, thus they impact product testing. Changes include: software changes, electronic modifications (parameter adjustments, parts replacement, component variations), firmware modifications (programmable logic, clock synthesizers programming, EEPROM updates), manufacturing data (dates, product batch codes), labeling and marking, mechanical adjustments (heat sinks, sheet metal modifications, fasteners), cosmetics changes, user documentation specifications and test plans, etc.

Maintaining a validation status for these systems, where each requirement can be verified with at least one or more test cases, is a daunting task in this ever changing environment. Various tools and processes exist in the field of computer aided product development, but the vast majority of these tools are targeted for pure software systems, with the abstraction of the hardware subsystems. These tools usually consider each copy of the same revision of the software to be a functional clone equivalent and are usually not designed to track test configurations. Thus, they are not optimized to provide good test repeatability in real life situations when the functionality (or performance) of the system as a whole is considered. Coverage report against changing specifications or a modified system is impacted as well.

In a project, it is highly desirable to maintain a structured set of requirements and to aggregate various attributes to these requirements to track project progress and completion. When a structured set of requirements exist, a complete test plan can be put together listing how each requirement is being verified with one or many test cases. Unfortunately, most computer aided testing tools are currently centered around test case management where various strategies are used to record and playback test cases in the form of scripts or automated actions performed on a target system. These tools put more emphasis on attempts to parameterize the test cases in order to cover various corner cases (with or without automatic parameter pairing and other reduction schemes), but do not usually clearly map test cases to requirements in order to compute requirement coverage with tests.

Even though good top-down architecture and design methodologies are well known, a surprisingly wide-spread technique has also found use in many projects where requirement verification has been forfeited, often because of the added burden of the change requests to the requirements, the design itself or the test cases. The technique involves using spreadsheets or check lists to track overall system performance with a sub-set (and often ad-hoc based) list of test cases. In this situation, it is very difficult to perform effective requirement tracking, to assess specification compliance or generate coverage reports for each prototype.

Improvements to overcome some or all of the above-noted deficiencies are therefore desired.

SUMMARY

This description relates to the testing of machines or systems having a combination of Hardware and Software subsystems with related requirements. More specifically, it relates to requirement driven testing of the systems, taking into account real-world constraints, such as changing requirements, evolutions in system design and system prototype variations.

The present application describes a system and method for requirement driven interoperability/compliance testing of Hardware and Software in a distributed environment. Three modules are configured as a default system: a test definition, a SUT definition and a test result. A series of tree elements are coupled to represent requirements to test case mapping. Test cases are executed and components in the system are assigned with test results while requirements coverage is computed. Auto-detection of additional parts and test cases enables validity checking of the requirement to test case tree and reports are generated.

According to an embodiment of the application, there is provided an interoperability/compliance test system for performing tests on a system under test (SUT), the test system comprising: an integrity engine comprising: a test definition engine for receiving test requirements, for inserting test objects into a structured format for a test definition, the test definition structured format comprising a test definition default object, and for linking a test script to one of the test requirements; an SUT definition engine for inserting SUT objects into a structured format for an SUT definition, the SUT definition structured format comprising an SUT default object, components of the SUT, and a state for each of the components; and a test result engine for inserting test result objects into a structured format for a test result definition, the test result definition structured format comprising at least one of a test event, a measurement and configuration; wherein when a new object is to be inserted in one of the structured formats and the new object does not belong to any specific parent object it is inserted in one of the default parent objects thereby each one of the engines can be used independently and in any sequence to complete at least a part of an interoperability/compliance test; and a test harness for connection to the SUT and integrity engine, the test harness for receiving the test script, for using the test script to send stimuli to the SUT, for capturing a resulting response from the SUT, and for forwarding the resulting response to the test result engine.

According to an embodiment of the application, there is provided an interoperability/compliance test method performing tests on a system under test (SUT), the test method comprising: receiving test requirements; inserting test objects into a structured format for a test definition, the test definition structured format comprising a test definition default object; linking a test script to one of the test requirements; inserting SUP objects into a structured format for an SUT definition, the SUT definition structured format comprising an SUT default object, components of the SUT, and a state for each of the components; inserting test result objects into a structured format for a test result definition, the test result definition structured format comprising at least one of a test event, a measurement and configuration; wherein when inserting an new object in one of the structured formats and the new object does not belong to any specific parent object it is inserted in one of the default parent objects; receiving the test script; for using the test script to send stimuli to the SUT; capturing a resulting response from the SUT; and outputting the resulting response.

BRIEF DESCRIPTION OF THE DRAWINGS

Further features will become apparent from the following detailed description, taken in combination with the appended drawings, in which.

It will be noted that throughout the appended drawings, like features are identified by like reference numerals.

DESCRIPTION

Figure 1:
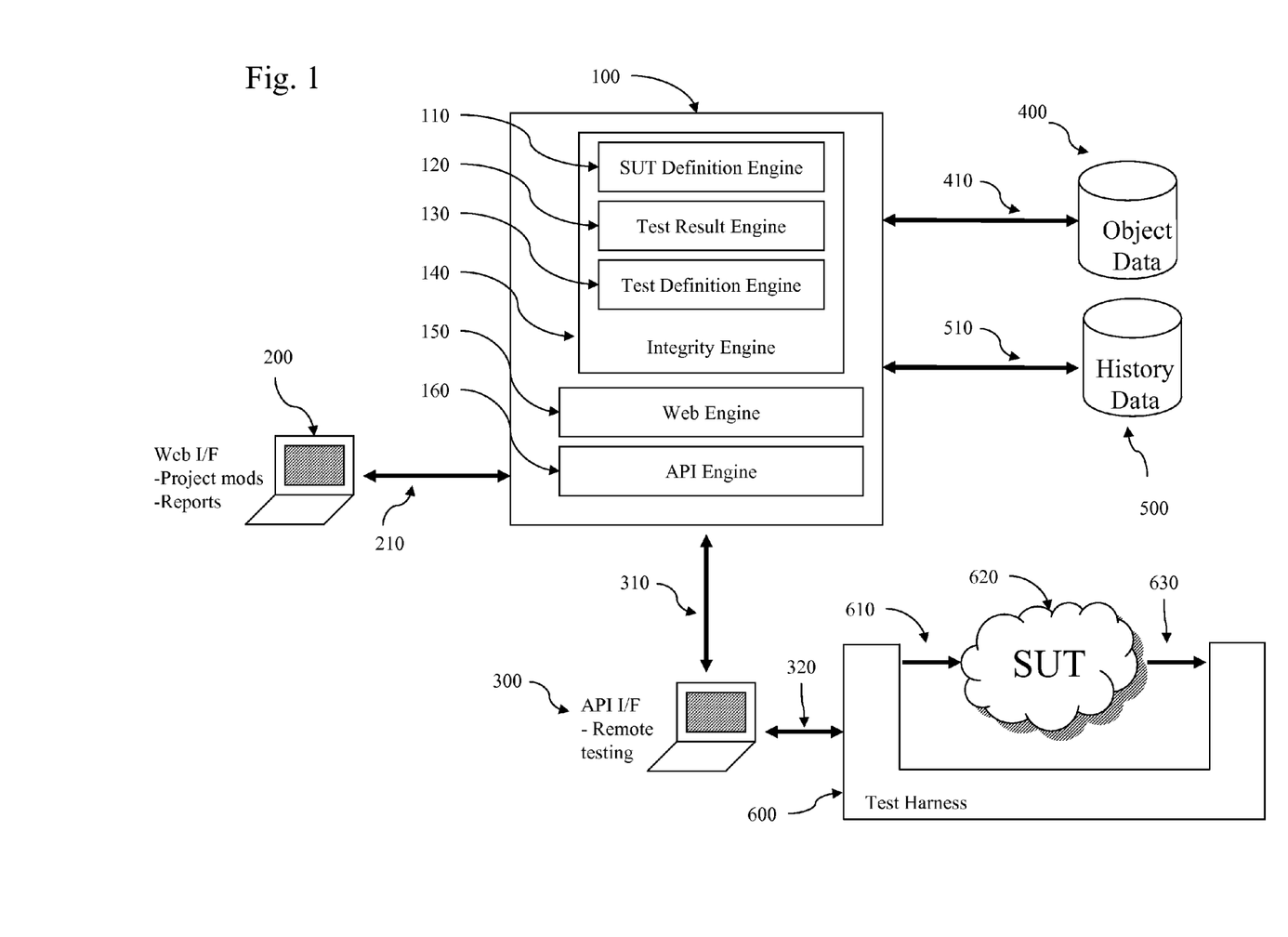
FIG. 1 is a schematic diagram showing a high level dataflow depicting the main components of the requirement testing system according to an embodiment of the application.

FIG. 1 is a high level dataflow depicting the main components of the requirement testing system which may be used to describe the interactions of the main components of the system.

Main Program 100 is a module that comprises SUT Definition Engine 110, Test Result Engine 120 and Test Definition Engine 130, which are specific components of Integrity Engine 140. Integrity Engine 140 is used to operate on the links between all the objects in the system and is responsible to maintain referential integrity between the objects using Communication Channel 410 to access Object Database 400, which is used for storing object data. Object Database 400 and Communication Channel 410 are typically implemented using postgreSQL jointly with its complementary networked Application Programming Interface (API) that is very well known art in the field of computing science. Object Database 400 and Communication Channel 410 can also be implemented using any form of object persistency that are also well known, including memory mapping, linked chains or other tools of the trade.

Main Program 100 and Integrity Engine 140 may be implemented using a Symfony framework, itself written in php and running from a lighttpd server. Main Program 100 and Integrity Engine 140 could as well be implemented using an Apache™ server or any web page server, as is very common in the art.

Objects and the object model will be further described with the detailed description of FIG. 2 hereinbelow.

Integrity Engine 140 also has an access to History Database 500 using standard Communication Channel 510. History Database 500 acts as the revision control system by keeping track of all revisions of all elements transiting through Main Program 100. Example of such elements include products, software, test cases, configurations, measurements, parts, requirements, annotations, api xml transactions, etc. History Database 500 and Communication Channel 510 may be implemented using subversion ("svn") and associated networking protocols svn://. History Database 500 and Communication Channel 510 is very well known by those skilled in the art and can be implemented using other revision control systems, such as cvs, or any sort of associated transport protocol such as svn+ssh, https or other.

Web Engine 150 may be implemented using a Symfony framework, itself written in php and running from a lighttpd server. Web Engine 150 could as well be implemented using an Apache™ server or any web page server, as is very common in the art.

API Engine 160 may be a specific xml API that can be accessed as a web service running from, for example, a lighttpd server. API Engine 160 responds to xml requests transported over the https protocol. API Engine 160 could as well be implemented using other transport protocols, such as the less secure but faster http protocol and could be running off of an Apache™ server, as is well known in the field.

It will be understood that when referring to a lighttpd server, an Apache™ server or any web page server, for Main Program 100, Integrity Engine 140, Web Engine 150 and API Engine 160, many possible configurations for the server or servers is possible. For example, each of Main Program 100, Integrity Engine 140, Web Engine 150 and API Engine 160 can be instantiated on a single or multiple servers, or any grouping of Main Program 100, Integrity Engine 140, Web Engine 150 and API Engine 160 can be instantiated on a single or multiple servers.

Personal Computer 200 is a typical personal computer running Linux™, Windows™ or any suitable operating system and accessing resources and functionality exported by Main Program 100 through Communication Channel 210, a typical https channel implemented as part of a regular web browser or from specific scripts or programs. Requests sent to Main Program 100 are processed by Web Engine 150 when in the form of web pages and from API Engine 160 when in the form of specific xml data encapsulated over https requests. These interactions are meant to let an authenticated user of the system manipulate and update the test object data, create test reports and use the management functions of Main Program 100.

Personal Computer 300 is another personal computer running Linux, Windows or another operating system and can, concurrently with Personal Computer 200, access Main Program 100 resources and exchange test result data as part of any kind of remote testing activity. Communication Channel 310 is typically used for xml transactions representing test results and SUT configuration data. Communication Channel 310 is used to interface standard test apparatus to Main Program 100's xml API format.

Test Harness 600 implements a typical test harness, as found in the CPAN perl modules compatible with Test::More and Test::Harness. Test Harness 600 is used to send stimuli on Communication Link 610 to SUT 620 and record an SUT response on Communication Link 630 as part of a test case. SUT 620 can be any combination of sub-systems comprising either hardware or software components, or both hardware or software components. SUT 620 can be seen as a specific prototype or as a specific prototype with the addition of measuring devices, such as, but not limited to sensors, multimeters, protocol bridges, industrial computers, programmable logic, interface circuits or other apparatus to generate stimuli or measure a system behavior or parameter.

In certain particular cases, most notably to suit the nature of SUT 620, Communication Link 610 and Communication Link 630 can be implemented with a manual intervention where a test case would be conducted by a person or a group of persons. In those cases, the stimuli becomes a set of manual operations that are applied to SUT 620 and the SUT response becomes the observation of SUT 620 behavior as noted by the persons operating it. In addition, a mix of automated and manual intervention can occur in any proportion during a test case or through a suite of test cases.

Figure 2:
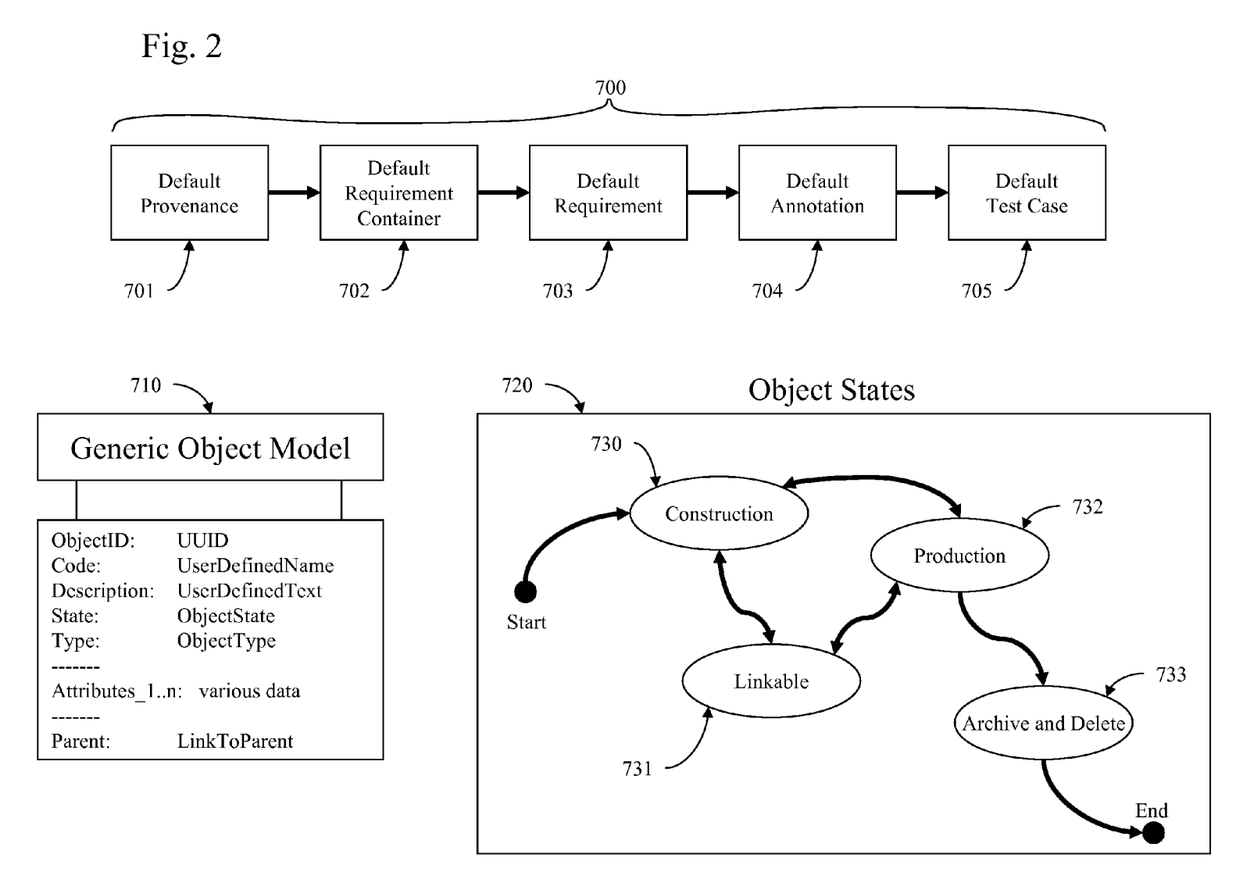
FIG. 2 is a schematic diagram showing a presentation of the object model for the Test Definition Engine according to an embodiment of the application.

FIG. 2 is a presentation of the object model for the Test Definition Engine. Test Definition Default Chain 700 is the default chain used to maintain referential integrity for partial test dataset. This default object chain is always present for the Integrity Engine 140 to resolve boundary conditions and to avoid loss of data. The presence of the default chain enables the use of multiple testing processes and, in particular, any out-of-sequence process. An example of the application of an out-of-sequence process is when test cases from an old revision of a product are still used on a new prototype while the exact labeling of requirement is not yet available.

Figure 4:
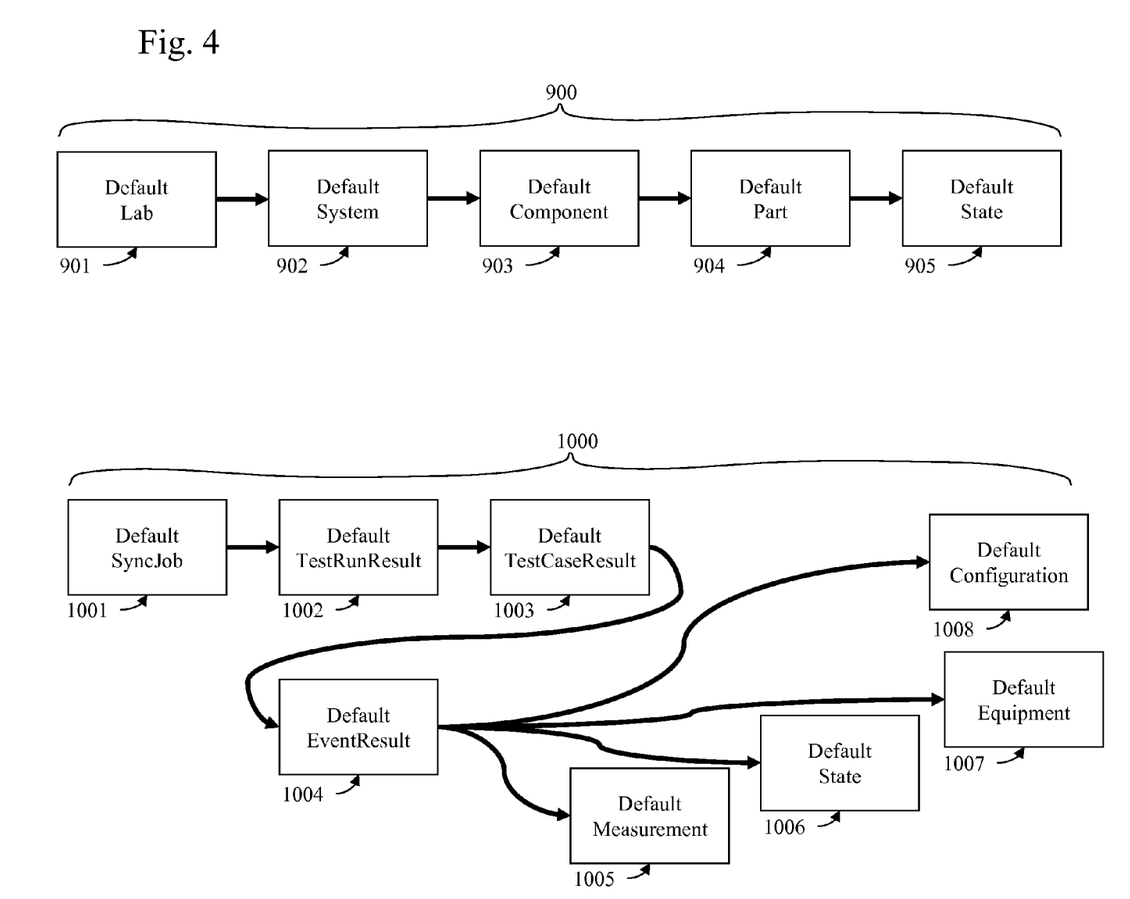
FIG. 4 is a schematic diagram showing a presentation of the default chains for the System Under Test (SUT) Definition Engine and the Test Result Engine according to an embodiment of the application.

All the objects described in Test Definition Default Chain 700, SUT Definition Default Chain 900 and Test Result Default Chain 1000 share a common Generic Object Model 710. Generic Object Model 710 is implemented using database object persistence and is manipulated in computer memory by the Integrity Engine 140. A set of general fields are common to all objects. The "UUID" is a unique identifier satisfying the definition of the Open Software Foundation and is known to be unique with a reasonable certainty within all computing platforms. The "Code" is used as a user mnemonic to facilitate the identification and manipulation of the object when presented in large groups. The "Description" is a generic text field that is available for the user. The "State" is a variable that is initialized with the value "Construction" at object creation time and is destroyed when the object is deleted from the database. A variable amount of "Attributes n" fields, where n is an integer that goes from 0 to N, is used for fields that are user customizable or are specific of a particular object. The field "Parent" is used to store the "UUID" of the parent object. Various other links might also be added, as is well known in prior art for database table relationship design or linked list implementation, all of which used mainly for various speed or space optimization.

The "Type" field in Generic Object Model 710 is used to bless or instantiate the object into one of the possible types for each chain. In the Test Definition Default Chain 700, the types of objects presented in example are: "Provenance", "Requirement Container", "Requirement", "Annotation", and "Test Case".

The objects are created in "Construction" state as depicted in State Diagram 720. The object lifecycle presented is typical of a multi-user implementation. In an embodiment, there are defined three working states "Construction" 730, "Linkable" 731 and "Production" 732. An object can be cycled through any of these states, based on the user's rights and the current state of the object. When in "Production" state 732, the object can be sent to "Archive and Delete" state 733 and be archived in the History Database 500 and then deleted from the Object Database 400. This specific arrangement of states is very flexible and can be tailored for specific purposes or specific processes. Standard user rights management and process interlocks are implemented to support specific process needs. An example of this is the hardcoding of a programmatic rule (an "if" statement) in the Integrity Engine 140 such that only a specific user of the system can send objects from "Production" state 732 to "Archive and Delete" state 733, thus implementing a crude protection scheme that prevents deletion of the data in the system, based on user rights.

Default Provenance object 701 is an entity that issues a specification. Requirement Container object 702 is a specification issued by a provenance. In the present description, the provenance is used as a parent identifier with a name, a description, insertion date, insertion user, and similar fields. The Requirement Container object 702 contains similar fields plus a pointer on an electronic copy of the associated document stored in the database for archiving and later retrieval. Default Requirement object 703 is the default requirement for the system. Default Annotation object 704 is the default annotation for the system and Default Test Case object 705 is the default test case for the system.

Figure 3:
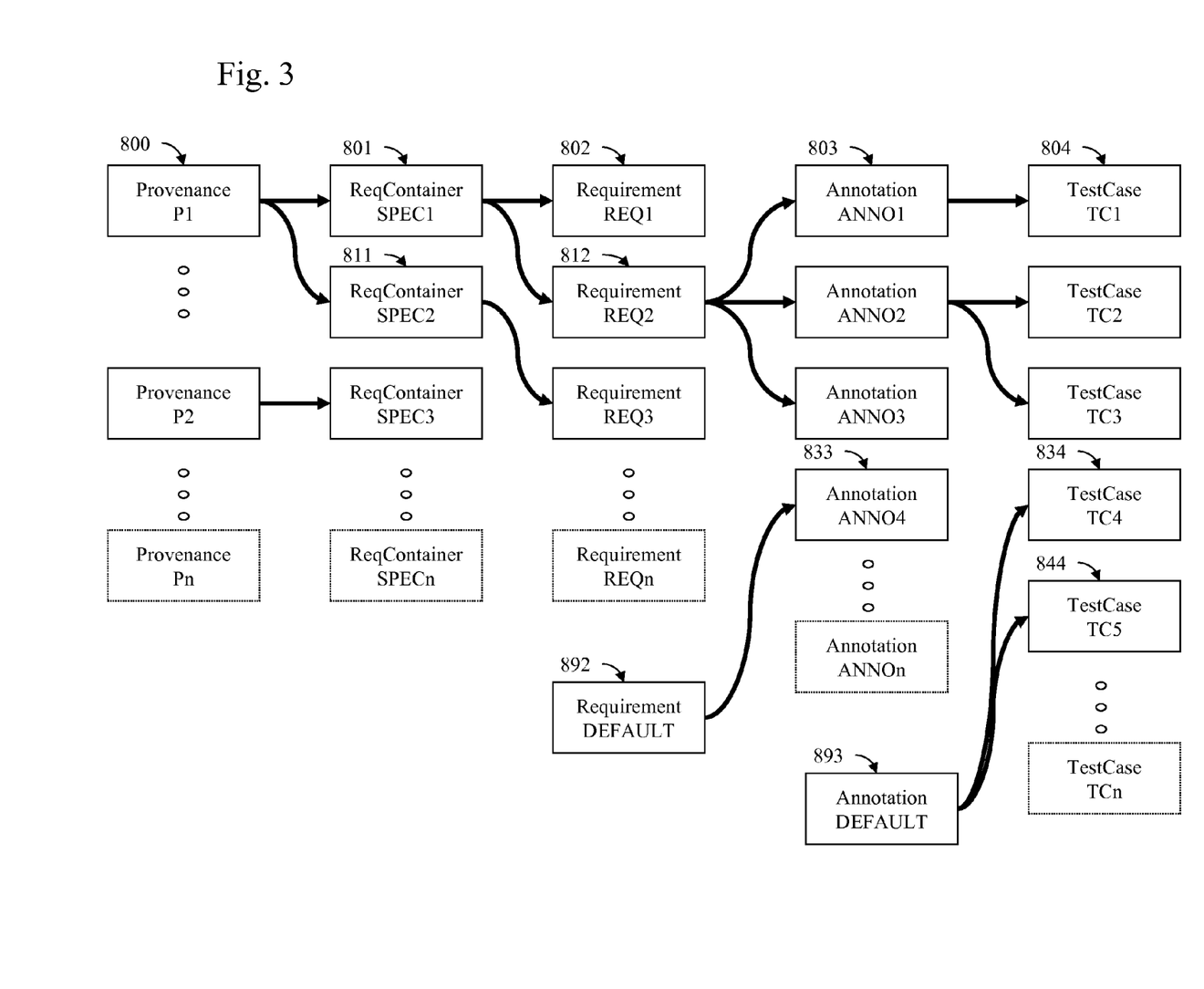
FIG. 3 is a schematic diagram showing a hierarchical view of a typical Test Definition Engine data pattern according to an embodiment of the application.

Thus using the objects presented in Test Definition Default Chain 700, it is possible to arrange them in complex Test Definition representations (i.e., in a "tree" structure) such as the example given in FIG. 3. Re-using the Generic Object Model 710 and building from the Test Definition Default Chain 700, it is possible to attach any number of children to any object as is the case for Provenance object 800 that is linked to ReqContainer SPEC1 object 801 and ReqContainer SPEC2 object 811 by virtue of having both object 801 and ReqContainer SPEC1 object 811 listing Provenance object 800's QUID in their parent's field. The Integrity Engine 140 is used in conjunction with the Web Engine 150 and the API engine 160 to create, modify, delete and associate the objects in complex arrangements.

The no orphans rule is applied by Integrity Engine 140 so that an object for which no parent is specified is automatically assigned to the nearest default parent for this object as is depicted for Test Case TC4 object 834 and TestCase TC5 object 844 that are linked to Annotation DEFAULT object 893. The nearest parent type is defined by looking-up the parent's "Type" value of the default object having the same "Type" as the object for which the request is made. Thus arrangements follow the original layout order of the default chain.

Integrity Engine 140 uses the field "Parent" in the object to ensure that each object possess one and only one parent, whether it is the default parent of the proper type or a new object of the proper type.

The resulting arrangement shown in FIG. 3 can easily accommodate all kinds of changes: links can be reassigned; new objects can be added, modified or deleted; etc. This arrangement is also very effective in copying or displacing sub-trees in new insertion points such as, for example, when entire sets of requirements are modified (and their revision number eventually changed) or re-assigned to a new specification, when a legacy set of test cases are re-utilized for a new set of annotations.

An example of the Test Definition Objects follows. All the UUID values used in tables 1 to 4 would follow the ISO/IEC 11578:1996 definition and would have a 16 byte format. An example of a typical UUID is presented here: 550e8400-e29b-41d4-a716-446655440001. In the tables 1 to 4 we present these UUIDs using a simplified template to help understanding the relationships between the tables. Fields that are blank are marked with [EMPTY]. The format is UUID_[object_name]. In this example, Provenance 800 object could be defined with the fields as defined in Table 1.

TABLE 1

Typical values for Test Definition Object Fields

| Type | Provenance | Req. Cont. | Requirement | Annotation | Test Case |
|---|---|---|---|---|---|
| UUID Code | UUID_PROV Network Working Group | UUID_REQCONT RFC1972 | UUID_REQ MTU1 | UUID_ANNO ANNO_MTU1 | UUID_TC TC1 |
| Desc. | From www.faqs.org | Ver. August 1996 | Max IPv6 pkt length | No support for Rout. Adv. | Packet Too large |
| State | Prod. | Prod. | Const. | Cons. | Const. |
| Parent | (EMPTY) | UUID_PROV | UUID_REQCONT | UUID_REQ | UUID_ANNO |

In FIG. 4, two other default chains according to an embodiment of the application are shown. SUT Definition Default Chain 900 is used to model the SUT. Test Result Default Chain 1000 is used to model the test results.

Default Lab object 901 is the default laboratory in which the experiment took place. The "Description" field of this object is used with other generic fields to identify lab characteristics when not specifically given in the testing. Default System object 902 is the default system and can be used to record specific details of the system under test, such as a name mnemonic for a chassis in the case of telecommunication apparatus. Default Component object 903 is the default component that is assumed for all testing when none are given in the test results. Default Part object 904 is the default part number associated with the default component. Default State object 905 is the default state in which was the component.

These default values are there to provide hooks for other objects and to progressively gather information from the testing that is performed.

Objects Default SyncJob 1001, Default TestRunResult 1002, Default TestCaseResult 1003 and Default EventResult 1004 are used to model the recording of test events generated by the execution of the test cases in the test harness. The test results are compiled by Test Harness 600 and synchronized through API Engine 160 using Communication Channel 310 and Communication Channel 320. One synchronization operation is called a "SyncJob" and is modeled and recorded by the Default SyncJob object 1001. The data exchange according the this embodiment is in xml format, but could be done in any format that is suitable for the specific Test Harness used for Test Harness 600. Default TestRunResult object 1002 is a "Test Run Result" and models the consecutive execution of specific test cases in the same harness. Default TestCaseResult object 1003 is the "Test Case Result" and models all data that is returned by a test case, including all "Event Results" 1004, all "Measurements" 1005, all "State" 1006 declaration, all "Configuration" 1008 files uploaded, all test "Equipment" 1007 used in the measurements.

Using the objects presented in SUT Definition Default Chain 900, it is possible to arrange them in complex SUT Definition representations (i.e., in a "tree" structure, not shown in a Figure, but similarly to the Test Definition representations/hierarchy example given in FIG. 3).

An example of the SUT Definition Objects follows in Table 2.

TABLE 2

Typical values for SUT Definition Object Fields

| Type | Lab | System | Component | Part | State |
|---|---|---|---|---|---|
| UUID Code | UUID_LAB Wellington Lab | UUID_SYSTEM DEMO1 | UUID_COMP PCI Eth. Controler | UUID_PART S/N 00134 | UUID_STATE DUPLEX |
| Desc. | The new lab | Partial system - slow CPU | Alternate chipset | Has been dropped on the floor twice | FULL=1 or HALF=2 |
| State Type | Prod. Lab | Prod. System | Const. Component | Const. Part | Const. State |
| Parent | [EMPTY] | UUID_LAB | UUID_SYSTEM | UUID_COMP | UUID_PART |
| Attribute_1 (Value) | [EMPTY] | [EMPTY] | [EMPTY] | [EMPTY] | 1,2 |

Using the objects presented in Test Result Default Chain 1000, it is possible to arrange them in complex Test Result Definition representations (i.e., in a "tree" structure, not shown in a Figure, but similarly to the Test Definition representations/hierarchy example given in FIG. 3).

An example of the Test Definition Objects follows in Table 3 (in two parts for ease of reading).

TABLE 3

| (Part I) - Typical values for Test Result Object Fields | | | | |
|---|---|---|---|---|
| Type | SyncJob | Test Run Result | Test Case Result | Event Result |
| UUID | UUID_SYNC | UUID_TRR | UUID_TCR | UUID_ER |
| Code | User1__2007-04-22 | [EMPTY] | [EMPTY] | [EMPTY] |
| Desc. | [EMPTY] | [EMPTY] | [EMPTY] | [EMPTY] |
| State | Prod. | Prod. | Prod. | Prod. |
| Type | Sync Job | Test Run Result | Test Case Result | Event Result |
| Parent | [EMPTY] | UUID_SYNC | UUID_TRR | UUID_TCR |

| (Part II) - Typical values for Test Result Object Fields | | | | |
|---|---|---|---|---|
| Type | Measurement | State | Config. | Equipment |
| UUID | UUID_MEAS | UUID_SRES | UUID_CONFIG | UUID_EQUIR |
| Code | Packet Length | DUPLEX | Environment dump | Router Tester |
| Desc. | The measured packet length | The type of connection | All register values, FW and SW ver. | Model 4, 100 Meg Eth. |
| State | Prod. | Prod. | Prod. | Prod. |
| Type | Measurement | State | Config. | Equipment |
| Parent | UUID_ER | UUID_ER | UUID_ER | UUID_ER |
| Attribute_1 (Value) | 1448 bytes | FULL | [FILE_CONTENT] | 1 |

Web Engine 150 displays the objects stored in Object Database 400 using generic Graphviz primitives and provides useful filters to navigate through the data. Other graph traversal and drawing libraries could be used, as is well known in the field. Specific searches involving "default" elements are used to verify the sanity of the database and permit a quick visual assessment of the data.

Links between Test Results and Test Definition trees (not shown) are performed by defining a "file" variable and an associated "file_MD5" checksum in TestCase object 804. These fields are used to match TestCase objects, such as TestCase objects 804, 834 and 844 with associated Test Case Results. Test Case Results are produced manually or automatically by a test script. The match is based on the value of the "file" field and the well-known MD5 checksum, for example, is used to detect changes that would affect the revision of the test case pending to a change in the associated test script. Any detected change triggers the creation of a snapshot in the history database. In the current art, and as is frequently used in perl modules under the "t" or testing directory, the complete path to a test case is often used as a name, up to the harness name itself (or "module" in perl terminology). This creates a much larger namespace for test scripts and facilitates script re-use from harness to harness. For example, when a test script in a module called "Harness1" is located on a disk drive and executed from: "/home/user1/Harness1/t/test1.t", the label "Harness1/t/test1.t" would be used as a link so that all results coming from the execution of this script would linked to TestCase object 804 if the "file" variable is set to "Harness1/t/test1.t". The MD5 checksum is computed on the contents of "test1.t". This method of keeping all the pertinent Test Definition data as well as all the pertinent Test Case Result data loosely coupled enables to quickly re-attach test cases to modified requirements and to easily detect any revision change and maintain the database integrity in real world project environments. Differential history snapshots, as available from svn, are fully leveraged in this solution to obtain any previous version of the test environment and all the legacy data.

Links between SUT Definition Default Chain 900 type chains and Test Result Default Chain 1000 type chains are computed on test result insertion and when proper Measurements and State declarations are declared. The SUT Definition can thus be populated by explicit listing of the material or can be self discovered as the testing progresses. State values that are typically used for component identification are "COMPONENT_SERIAL", "COMPONENT_MODEL" and/or "COMPONENT_ASSET_NUMBER".

Integrity Engine 140 also computes statistics on the Test Definition, the SUT Definition and the Test Result data. This feature enables the generation of reports such as how many times TestCase object 834 has been declared as "PASSED" in the last 30 days while using standard SQL requests on Object Database 400 since all the test results for which the script name was the same as the one declared in 834 can be extracted. A very large number of such requests can be imagined by any computer programmer skilled in the art of SQL request generation.

The use of the interoperability/compliance test system shown in FIG. 1, will now be described along with FIG. 2 and FIG. 3. First, a user defines a set of interoperability/compliance Requirements according Test Definition Default Chain 700 and using a web browser on computer 200 to access the Web Engine 150. These Requirements are then detailed with specific annotations and associated to TestCases according to Test Definition Default Chain 700 as presented in FIG. 3.

Alternatively, the user may enter a set of interoperability/compliance Requirements using API Engine 160 in a known xml format. The set of interoperability/compliance requirements may therefore be read and entered automatically.

Another or the same user or set of users concurrently assembles the Test Harness 600 and the SUT 620 and connects them using networking equipment to computer 300. To start the compatibility testing, the user accesses Portable Computer 300 and launches a test script. Test script(s) executed on computer 300 provide a set of stimuli 610 while recording the related SUT responses 630. An example of such a script may be written in perl with the Test::More module (form www.CPAN.org), located on computer 200 in /home/user1/simple_test/t/ssh_prompt_check.t to perform an ssh login on the SUT and verify if the SUT answers with a prompt and the script terminates with a result file in, for example, an XML format. The PASS/FAIL result of this simple test script is then exported to the API engine 160 using an xml format through an https transaction and an xml tag comprising this information: "<file>simple_test/t/ssh_prompt_check.t</file>".

The test result could be augmented with specific configuration data to improve test documentation and repeatability. Items such as: the name of the user, the date of start and the date of end of the execution, a system name identifier, sub-system serial numbers, sub-system version numbers, etc. could be added for storage by using the object format such as shown in Table 3 (part II). The "file" field is used by Integrity Engine 140 to establish the proper link with the Test Definition objects. In the case where no existing Test Case object 804 would match the content of the "file" field, the results are associated to the default test case 705.

Another (or the same) user logs into Portable Computer 200 to access reports through the Web Engine 150 where the test results are presented. Statistics of the ssh_prompt_check.t execution are presented in the associated Test Definition objects and back propagated from the Test Case, up to an associate Provenance. Specific compliance can be assessed and specific test information are extracted from the database and presented to the user.

A specific feature of the invention is that these steps can be performed in different order to accommodate real life constraints. For example if the list of requirements (or their complete description) is not available at the time of the testing (as is often the case with commercially available test suites for specific certifications), all the test cases can nonetheless be executed, their results collected and presented using the default requirement. At a later time, a user can re-map the collected test cases and associated results to specific requirements defined using the computer 200 to access the Web Engine 150 with a web browser through secure https connection 210.

A concrete example of the Test Definition Objects follows. All the UUID values used in tables 1 to 4 would follow the ISO/IEC11578:1996 definition and would have a 16 byte format. An example of a typical UUID is presented here: 550e8400-e29b-41d4-a716-446655440001. In the tables 1 to 4 we present these UUIDs using a simplified template to help understanding the relationships between the tables. Fields that are blank are marked with [EMPTY]. The format is UUID_[object_name]. In this example, Provenance 800 object could be defined with the fields as defined in table 1.

Those skilled in the art may recognize other embodiments and/or methods to provide such functionalities, either through a central distribution of computer code to networked computers, a computer program adapted for such an application and performing the application on computers, or program codes broadcasted using a suitable carrier or saved in memory or another storing medium. The program codes are suitable or responsible, when loaded on a computer, for making the system perform functionalities described herein. All such alternatives are intended to be incorporated in the present document.

It will be noted that the above embodiments illustrate different characteristics according to embodiments of the instant application. Those skilled in the art will recognize that, even if the embodiments of the present document describe these characteristics as part of different embodiments, one could differently use or combine some of these characteristics without departing from the scope of the application as intended to be set. Furthermore, embodiments may also present other characteristics and/or variations, with such characteristics falling within the scope of the application, as set forth in the appended claims.

Furthermore, while some of the appended figures illustrate the application as groups of discrete components, it will be understood by those skilled in the art that the application may be embodied differently, for instance through a combination of hardware and software components with some components being implemented by a given function or operation of a hardware or software system. The structure illustrated is thus provided for efficiency of teaching embodiments of the application.

Thereupon, it is the intent through the present document to efficiently teach an invention through embodiments, while the scope is solely intended to be limited by the appended claims.

We claim:

1. An interoperability/compliance test system for performing tests on a system under test (SUT), the test system comprising:
   an integrity engine comprising a server; and a memory accessible by the server and having computer code thereon, the memory implementing the server to provide:
      a test definition engine for receiving test requirements, for inserting test objects into a structured format for a test definition, the test definition structured format comprising a test definition default object, and for linking a test script to one of the test requirements;
      an SUT definition engine for inserting SUT objects into a structured format for an SUT definition, the SUT definition structured format comprising an SUT default object, components of the SUT, and a state for each of the components; and
      a test result engine for inserting test result objects into a structured format for a test result definition, the test result definition structured format comprising at least one of a test event, a measurement and configuration;
      wherein when a new object is to be inserted in one of the structured formats and the new object does not belong to any specific parent object it is inserted in one of the default parent objects thereby each one of the engines can be used independently and in any sequence to complete at least a part of an interoperability/compliance test; and
   a computing device in communication with the server for implementing a test harness, the test harness for connection to the SUT and the integrity engine; and for receiving the test script, for using the test script to send stimuli to the SUT, for capturing a resulting response from the SUT, and for forwarding the resulting response to the test result engine.

2. The test system of claim 1, comprising an object database accessible by the server via a communication channel, for storing at least one of: the test objects, the test definition default object, the SUT default object, the test result objects.

3. The test system of claim 2, comprising a web engine implemented on a server, the web engine having access to the server and the object database, for allowing navigation through data stored on the object database and for allowing access to the test results objects.

4. The test system of claim 1, comprising a history database having access to the server via a communication channel, the history database implementing a revision control system for tracking revisions of data being processed by the server.

5. The test system of claim 1, comprising an application programming interface (API) engine implemented on the server, for interaction with a computing device of a user, to allow the user to enter the test requirements in accordance with a given format.

6. The test system of claim 1, comprising a user computing device in communication with the server via a network, for allowing a user to access the server to at least one of: input test requirements; update the test objects;
request that the server generates a test report; managing test objects and test result objects using the server.

7. The test system of claim 1, wherein the integrity engine is implemented by the computer code to provide the test definition engine for linking the test script to the one of the test requirements using an annotation, the annotation being assigned to at least one of: the test script and the one of the test requirements.

8. An interoperability/compliance test method performing tests on a system under test (SUT), the test method comprising:
a server:
receiving test requirements;
inserting test objects into a structured format for a test definition, the test definition structured format comprising a test definition default object;
linking a test script to one of the test requirements;
inserting SUT objects into a structured format for an SUT definition, the SUT definition structured format comprising an SUT default object, components of the SUT, and a state for each of the components;
inserting test result objects into a structured format for a test result definition, the test result definition structured format comprising at least one of a test event, a measurement and configuration; and
sending the test script to a test harness connected to the SUT;
wherein when inserting a new object in one of the structured formats and the new object does not belong to any specific parent object it is inserted in one of the default parent objects and stored in a memory of the server;
a computing device implementing the test harness:
receiving the test script;
using the test script to send stimuli to the SUT;
capturing a resulting response from the SUT; and
outputting the resulting response for display on a display device.

9. The test method of claim 8, wherein the linking a test script to one of the test requirements comprises assigning an annotation to at least one of: the test script and the one of the test requirements.

10. The test method of claim 8, wherein the using the test script to send stimuli to the SUT comprises using the test script to generate a stimuli which comprises at least one of a set of manual operations on the SUT and a set of automated operations on the SUT.

11. The test method of claim 8, wherein the inserting the test results objects comprise inserting the configuration which comprises at least one of: a name of a user, a start date and an end date associated to an execution of the test, a system name identifier, a sub-system serial number, a sub-system version number.

12. The test method of claim 8, comprising the server generating a report upon receiving a request via a network from an other computing device; and sending the report to the other computing device for display thereon.

13. The test method of claim 8, wherein the receiving the test requirements comprises retrieving default test requirements; and wherein the linking, the inserting SUT objects, the inserting test result objects, and the sending the test script are reiterated upon user-entered test requirements are received by the server from a user computing device.

* * * * *